June 12, 1962 W. A. PLUMMER 3,038,205
PLASTIC TUBING
Filed Oct. 1, 1957
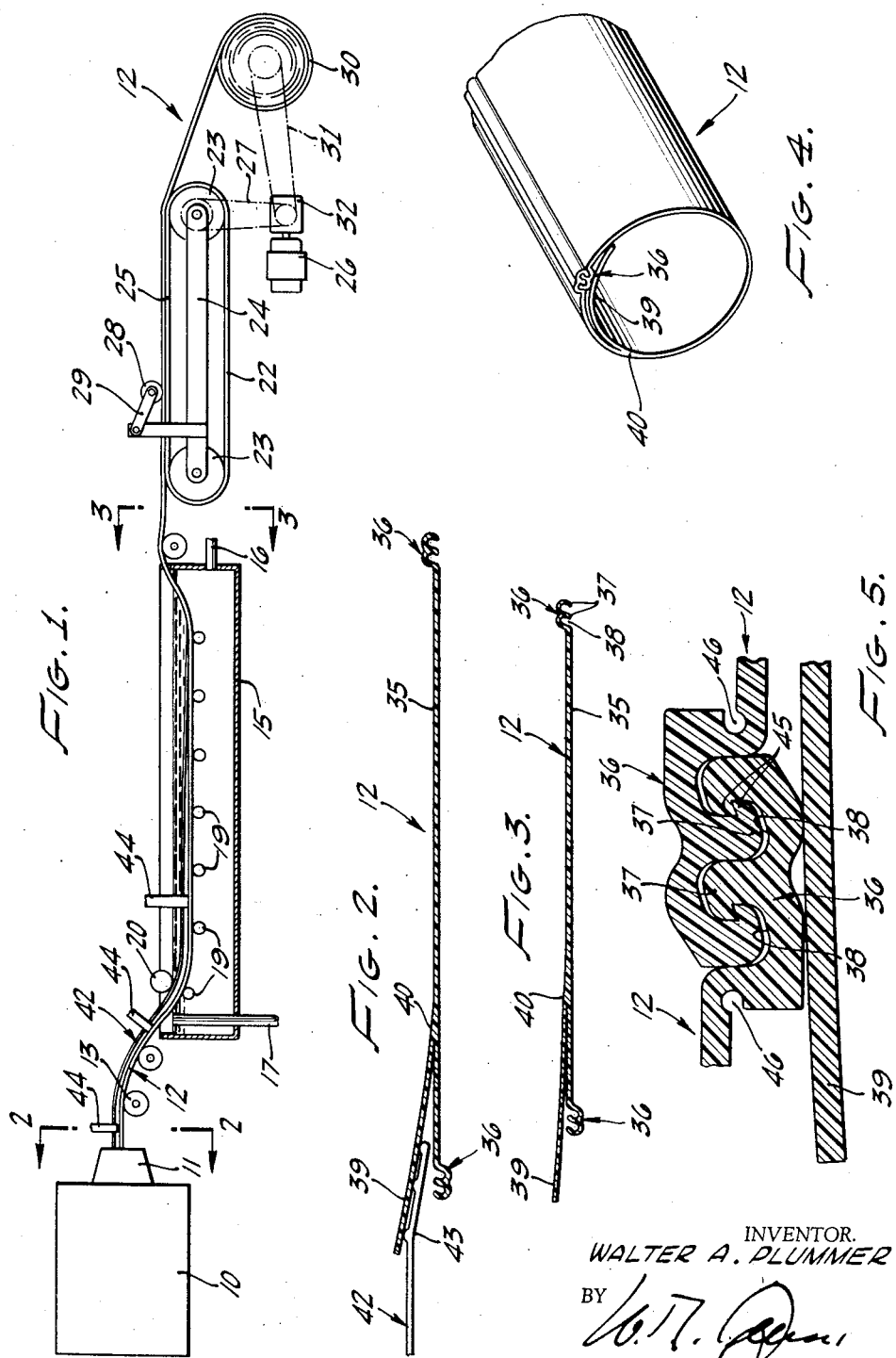
INVENTOR.
WALTER A. PLUMMER
BY
ATTORNEY United States Patent Office 3,038,205
Patented June 12, 1962

3,038,205
PLASTIC TUBING
Walter A. Plummer, North Hollywood, Calif.
(3546 Crownridge Drive, Sherman Oaks, Calif.)
Filed Oct. 1, 1957, Ser. No. 687,569
4 Claims. (Cl. 18—47.5)

This invention relates to the art of plastics and more particularly to an improved plastic product and a method of making the same in a continuous operation.

In applicant's co-pending application for United States Letters Patent Serial No. 687,399, filed October 1, 1957, now abandoned, entitled Plastic Tubing Product and Method of Making Same, there is disclosed a method of making plastic tubing in the form of a wide strip having plastic slide fastener tapes fused along either edge. These fastener tapes are so formed as to interlock to form tubing having a separable longitudinal joint. Such tubing has many applications and is being widely and successfully used. Nevertheless, it is subject to certain disadvantages obviated by the present invention. For example, each of the three principal plastic components must be manufactured separately and thereafter assembled to one another. This involves several independent and duplicate processing and handling operations of a costly and time consuming nature. The precise control essential for uniformity in the individual components is very difficult to achieve. Additionally, in practice it is found that slide fastener tapes warp and curl to such extent as to require special corrective processing preliminary to the fusion of the tapes to the body of the tubing.

One solution which has suggested itself to persons familiar with the processing of plastics has been the making of the flexible tubing product in a homogeneous piece of plastic having the interlocking fastener tapes formed integrally therewith along the lateral edges of the stripping. However, attempts to so form the tubing have not met with success prior to the present invention and have disclosed the presence of many vexatious problems. These include the design of suitable dies or other forming equipment for making thin flexible plastic material with integral interlocking elements capable of providing a joint which would strongly resist opening after assembly and which would provide a substantially fluid tight seal after assembly. Desirably the interlocking elements should be complementary to one another and capable of being made to precision specifications and in very small sections to the end that the tubing joint would not be disproportionately thick relative to the main body of the tubing. Attempts to mold the plastic to shape have not met with success heretofore because of the need for providing interior pockets or cavities of greater cross-section than the entrance as these are found essential to a strong joint.

Likewise attempts to extrude the tubing were equally unsuccessful for many reasons. For example, the need for extruding the plastic in a very thin wide form with thicker sections at either edge resulted in a product subject to various deformities and irregularities due to nonuniform cooling of the extruded material by reason of sections of varying thickness and the faster flow of the plastic through the extruder die in the areas rearward of the relatively thick lateral edge portions. It has also been very difficult heretofore to obtain uniform filling of the small die cavities of irregular shape required to form the interlocking tongues and grooves.

After much experimentation a method was evolved as will be fully disclosed herein below and by which a highly successful product has been provided. While many mutally coperating factors have contributed to the end result, one of the more important ones was the extrusion of a continuous strip of plastic material having greater thickness and width than that desired in the finished product. This procedure has greatly minimized the problems heretofore experienced in the design of the extruder die and in the provision of plastics which could be extruded successfully therewith.

The present invention also provides a one-piece extruded plastic strip and a method of making it featuring a guard flap integral with the main body of the stripping inwardly of the one edge and sufficiently wide to underlie the longitudinal seam of the tubing when assembled. The method provided for making this product includes means for holding the guard flap and the adjacent edge of the stripping out of contact while these elements are being drawn down to size and cooled sufficiently to take a set. The cooling operation is preferably conducted while the freshly extruded material is submerged in a counter-flowing stream of cooling water and while tension is being applied to previously cooled portions of the stripping in an amount sufficient to draw the uncooled portions down to the desired thickness and width. By reason of the design of the die to avoid sections of materially different thickness crosswise of the stripping it is found that all parts of the stripping and particularly the interlocking joint portions thereof can be drawn down to size without changing the relative proportions of any portion of the plastic product. Accordingly, this feature of the design is highly important.

Accordingly, it is a primary object of the invention to provide an improved method of forming a continuous unitary strip of plastic having lateral edges interlocking to form tubing.

Another object of the invention is the provision of an improved article of manufacture formed in a continuous operation and having interlocking elements on its lateral edges operable to form tubing.

Another object of the invention is the provision of a process for extruding plastic in a wide flexible strip with integral tongue and groove means.

Another object of the invention is the provision of a process for extruding a continuous strip of thin-walled flexible plastic stripping having a thickness and width greater than that desired in the end product and formed with complementary interlocking tongues and grooves along its lateral edges having wall thicknesses commensurate with the thickness of the remaining portions of the stripping whereby freshly extruded stripping can be drawn down to a desired size as the stripping cools without adversely affecting the relative proportions of the tongues and grooves.

Another object of the invention is the provision of a method of making a one-piece flexible plastic tube which can be packaged and shipped flat and assembled into a tube at the point of use by the engagement of complementary interlocking elements extending along the lateral edges thereof.

These and other more specific objects will appear upon reading the following specification and claims and upon considering in connection therewith the attached drawing to which they relate.

Referring now to the drawing in which a preferred embodiment of the invention is illustrated:

FIGURE 1 is a schematic view in side elevation showing suitable apparatus which can be used in expediting the manufacture of the tubing according to the process herein claimed;

FIGURE 2 is a cross-sectional view taken along line 2—2 and showing the relative thickness and width of the product as it discharges from the extruder die;

FIGURE 3 is a view similar to FIGURE 2 but taken along line 3—3 showing the relative thickness and width of the product after it has been drawn down to a desired size;

FIGURE 4 is a perspective view of the stripping after its assembly to form a length of tubing; and FIGURE 5 is a transverse sectional view on a greatly enlarged scale through the interlocked edges of the stripping.

Referring to FIGURE 1 there is shown a suitable extruder 10 having a suitable die 11 having a slotted opening of substantially the same size and contour as the stripping designated generally 12 in FIGURE 2. It will be understood that the extruder has therewithin means for forcing the hot fluid plastic of a desired composition and constituency through the die slot in the form of ribbon shown in FIGURE 2. This ribbon begins to cool quickly but is of such a soft and semi-fluid consistency as to require initially substantially full support here shown as conveniently provided by closely spaced guide rollers 13. Spaced closely to the discharge end of extruder die 11 is suitable means for gradually cooling the plastic stripping.

While either gas, liquid or both may be employed, excellent results are achieved using a long shallow trough 15 through which a steady stream of cooling water flows counter to the advance of the stripping. To this end, cold water enters through pipe 16 at the far end of trough 15 and overflows through discharge pipe 17 at the forward end of the trough. The overflow pipe 17 extends above the bottom of the trough and serves to maintain a predetermined height of water. Thermostatic means may be provided if desired to regulate the water flow at a rate to maintain the temperature of the discharging water at a desired level such as normal room temperature. Closely disposed rollers 19 or equivalent supporting means are mounted crosswise of trough 15 and provide substanstially continuous support for the stripping as it advances through the trough. A roller or other guide means 20 at the forward end of the tank may be used to aid in feeding the stripping into the cooling water bath.

An important feature of the product provided by the invention comprises a guard flap 39 having one edge 40 formed integrally with the main body of the stripping at a point spaced inwardly from one edge thereof. Guard flap 39 is sufficiently wide as to project well beyond the lateral edge of the tongue and groove section 36 for a purpose which will be best understood by reference to FIGURE 4. In certain applications the tubing provided by the stripping is used to enclose wires and in others it is used to hold insulation about heating pipes. Guard flap 39 will be understood as extending across the overlapped edges of the stripping thereby serving to prevent underlying material from entering the grooves while the seam between elements 36 is being closed. It also serves additional important purposes not of particular concern to the present invention.

Referring to FIGURE 2 it will be noted that either continuous strip or wire prong members indicated at 42 have a free end 43 underlying guard flap 39 and serving to hold the same out of contact with the underlying closure member 36 of the stripping. It is highly important that these parts be held separated as the stripping discharges from the extruder die and while it is cooling to a set condition in trough 15. It will therefore be understood that guide means 42, 43 extends from extruder die 11 downwardly into trough 15 and substantially to the far end of this trough, these elements being suitably supported as by a rigid hanger member 44. The advanced portion of members 42, 43 need not be rigidly supported other than as required to maintain elements 43 thereof positioned between flap 39 and the tongue and groove portion 36.

The means for advancing the freshly extruded stripping through the bath at a rate slightly in excess of the discharge of the stripping from the extruder die constitutes a very important feature of the invention. As herein shown this means comprises a conveyor belt suitably supported on rollers 23 and held taut as by framing members 24, upper run 25 of the belt preferably being located at a slightly higher elevation than the water level in trough 15. This arrangement facilitates the drainage of water from the advancing stripping back to the trough. The conveyor belt is driven forwardly as by a motor 26 and belting 27. Suitable control means, not shown, for regulating the speed of motor 26 and of conveyor 22 are provided.

It is essential that the speed control means be capable of very fine adjustment in order that the conveyor belt, aided by an idler roll 28 of suitable weight and mounted on the ends of pivoting links 29, will advance and apply continuous tension to cooled portions of stripping 12. This tension taken with the slightly faster rate of movement of conveyor belt 22 than the rate of discharge of the stripping from the extruder die effects the gradual drawing out of the hot and semi-fluid stripping as it cools and takes a set during its passage through trough 15. By the time the stripping emerges from the trough, it has cooled and taken a set such that no further drawing out occurs beyond this point. However, a gradual stretching and lengthening of the material occurs beginning at the point of exit from extruder die 11 and sometimes continuing to a slight degree until it emerges from the far end of cooling trough 15. This drawing out of the plastic stripping therefore will be understood to occur gradually and to result in both the thinning out and the lateral narrowing of the strip transversely thereof.

A greater stretching and drawing out can be effected by slightly increasing the speed of the conveyor, as well as by adjusting the pressure and temperature conditions within extruder 10. A very important feature of the drawing out procedure resides in the fact that the relative reduction in the wall thickness and groove width occurs in all portions of the stripping during the drawing down to size. In consequence of this, as well as the uniform contraction of the entire transverse width of the stripping, it is found that all dimensions of the edge portions of the stripping diminish proportionately to the decrease in wall thickness and the contraction in the width of the stripping, a factor of great importance.

The finished stripping discharging from conveyor belt 22 may be reeled on a mandrel in readiness for packaging and shipping. The reel indicated at 30 may be driven from motor 26 through belting 31 and a suitable slip clutch 32 operating independently of the drive for conveyor belt 22.

Referring to FIGURES 2 and 3 it will be noted that stripping 12 comprises a main body portion 35 of uniform thickness which varies from 8 mils to a much greater thickness depending upon the size of the tubing to be made therefrom. Its lateral edge portions are preferably formed in the shape of the letter W to provide a pair of tongues 37 separated by a pair of complementarily shaped grooves 38. These tongues and grooves along the opposite edges of the stripping face in opposite directions for interlocking engagement one within the other as the stripping is flexed into a circular loop to form a tube.

Referring now to FIGURE 5 showing a greatly enlarged cross-section through closure elements 36, 36, it will be seen that the detailed features of the tongue and groove follow those disclosed in the United States Letters Patent to Madsen 2,613,421. Thus each of the tongues 37 includes complementarily shaped hooks 45 held inter-engaged with one another in the fully assembled condition of the tubing joint with the back wall of the tongue bearing directly against the juxtaposed back wall of groove 38.

Another feature of the design is the provision of a shallow groove 46 at the junction of the main body of stripping 12 with the tongue and groove section 36. This groove provides desirable hinging action between the tongue and groove portion 36 and the main body of the tubing during assembly and disassembly of the longitudinal seam.

From the foregoing it will be recognized that there has been disclosed an integral plastic product and a method of making the same from commercially available plastic material of which there are many types and kinds. Various ones of the polyethylene and of the vinyl plastics are particularly suitable. It is desirable that these be compounded to have a Shore hardness number of 70 or higher, a Shore number 70 and 90 being found quite suitable for most applications of the tubing. Considerable difficulty is experienced in having the interlocking tongues and grooves retain their assembled position with Shore numbers below 70. Likewise difficulty is experienced in assembling the tongues and grooves if the Shore number exceeds 95. Although the disclosed product as shown and described includes a guard flap, it will be understood that this flap may be omitted in certain applications, this omission being accomplished in any suitable manner such as by blocking off the portion of the extruder die used in forming the flap.

While the particular one-piece flexible tubing product and the method of making the same herein shown and disclosed in detail is fully capable of attaining the object and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of making a one-piece flexible tube from a continuous seamless strip of homogeneous plastic material having complementary opposite-facing tongues and grooves extending along the lateral edges thereof adapted to interlock tightly with one another to form a tube having a strong longitudinal seam, said method comprising continuously extruding hot plastic material in a wide continuous strip having a thickness and width in excess of that desired in the finished product, said extruded strip being of substantially uniform thickness in the body portion thereof and formed with tongues and grooves along its lateral edges of such cross-sectional shape as to interlock with one another lengthwise of said strip, supporting said freshly extruded strip and passing the same while supported in flat form in heat exchange with a cooling medium, applying tension to a remote previously-cooled portion of said strip in a manner to draw out the same, said tensioning and drawing out causing uncooled portions of the strip to stretch and thin out thereby effecting the drawing of the freshly extruded thick strip down to a thinner narrower strip having the desired smaller dimensions in all portions thereof including said interlocking tongues and grooves, and thereafter pressing the tongues and grooves along the opposite lateral edges into interlocking engagement to form a one-piece flexible tube of homogeneous material and of a desired length and featuring a seam which may be opened and reclosed repeatedly.

2. That method of making seamless continuous flexible plastic stripping adapted to be shipped flat to the point of use and there assembled into tubular form with a fluid-tight separable longitudinal seam formed by complementary tightly interlocking thin-walled elements formed along the lateral edges of the stripping, said method comprising continuously extruding a thin strip of hot semi-fluid plastic having a thickness and width in excess of that desired for the finished product and formed with complementally shaped tongues and grooves along its lateral edges adapted to interlock and form a strong seam, feeding said freshly extruded strip into a body of cooling water maintained at a predetermined low temperature to cool said strip, applying tension longitudinally of the strip at a remote previously-cooled section of the strip to feed the same forwardly at a uniform rate slightly in excess of its rate of extrusion and just sufficient to draw the same down to a thickness and width desired for the finished product with said drawing out being confined to portions of the material which have not cooled sufficiently to take a set, the complementally shaped lateral edges of said strip being substanially of the same cross-sectional area and wall thickness whereby both edges draw down equally in response to the uniform lengthening of the strip during cooling and setting of said plastic.

3. That method defined in claim 2 which includes extruding said thin strip along with an integral relatively narrow strip having one edge attached to the first mentioned stripping inwardly from one lateral edge of the latter, and holding said two strips out of contact with one another until the hot plastic has been drawn down to size and has cooled sufficiently as not to adhere to itself on contact with another portion thereof.

4. That method of making extruded plastic stripping as defined in claim 2 wherein said stripping is of substantially uniform thickness in the body portion and is formed with a shallow groove spaced slightly inwardly from said complementary interlocking elements thereby to provide finished stripping having hinge connections between said interlocking elements and the main body of the stripping.

References Cited in the file of this patent

UNITED STATES PATENTS

| Re. 24,613 | Hageltorn | Mar. 3, 1959 |
| 2,451,986 | Slaughter | Oct. 19, 1948 |
| 2,499,421 | Samler | Mar. 7, 1950 |
| 2,698,463 | Conwell et al. | Jan. 4, 1955 |
| 2,747,932 | Volk | May 29, 1956 |
| 2,756,172 | Kidd | July 24, 1956 |

FOREIGN PATENTS

| 18,955 | Great Britain | Sept. 2, 1904 |